United States Patent [19]

Lowe et al.

[11] Patent Number: 4,721,059
[45] Date of Patent: Jan. 26, 1988

[54] NONCLAY CATBOX FILLER

[75] Inventors: H. Edward Lowe, 21525 Allegheny St., Cassopolis, Mich. 49031; Ricky L. Yoder, Elkhart, Ind.

[73] Assignee: H. Edward Lowe, Cassopolis, Mich.

[21] Appl. No.: 901,963

[22] Filed: Aug. 27, 1986

Related U.S. Application Data

[63] Continuation of Ser. No. 714,450, Mar. 21, 1985, abandoned.

[51] Int. Cl.4 ............................................. A01K 1/015
[52] U.S. Cl. ........................................................ 119/1
[58] Field of Search ............................................ 119/1

[56] References Cited

U.S. PATENT DOCUMENTS

| | | | |
|---|---|---|---|
| 3,636,927 | 1/1972 | Baum | 119/1 |
| 3,980,050 | 9/1976 | Neubauer | 119/1 |
| 4,157,696 | 6/1979 | Carlberg | 119/1 |
| 4,203,388 | 5/1980 | Cortigene et al. | 119/1 |
| 4,311,115 | 1/1982 | Litzinger | 119/1 |
| 4,458,629 | 7/1984 | Gerber | 119/1 |
| 4,494,482 | 1/1985 | Arnold | 119/1 |
| 4,560,527 | 12/1985 | Harke et al. | 119/1 X |
| 4,621,011 | 11/1986 | Fleischer et al. | 119/1 X |

Primary Examiner—Robert P. Swiatek
Attorney, Agent, or Firm—Thomas J. Dodd

[57] ABSTRACT

A clay-like filler material formed from treated paper sludge or other fibrous slurries and a method of treating the sludge to form the filler which includes the physical properties of clay fillers. The method involves adding materials to the shredded slurry to control color, bacteria, fungi, absorbency, pests, and fragrance. The slurry is then formed into granules and dried prior to being packaged.

21 Claims, No Drawings

NONCLAY CATBOX FILLER

This is a continuation of co-pending applicaton Ser. No. 714,450 filed on Mar. 21, 1985, and now abandoned.

BACKGROUND OF THE INVENTION

This invention relates to a filler for a cat box and to the method of producing the filler.

Cat box filler is a household commodity known to the vast majority of cat owners. It is used in the cat's litterbox and serves to absorb excrement and eliminate odors. Previous litterbox fillers were formed of naturally occuring absorbent materials such as clay and alfalfa. Other materials which were utilized as fillers included wood chips, sawdust, sand, peanut shells, rice hulls, pelletized grass, grain fibers and shredded paper or cardboard. The problems with these materials were low absorbency and lack of odor control. Also, the particles were easily fugitive. One such paper product is disclosed in U.S. Pat. No. 4,263,873.

SUMMARY OF THE INVENTION

The filler of this invention can be formed from many types of plant fiber. Generally, the fiber is from trees, sugar beets, sugar cane, citrus pulp, potatoes, grains (such as grass, rice, corn, wheat, etc.) or cotton. The preferred material is derived from primary or secondary wood pulp or sludge, citrus pulp or sugar cane. More specifically, such material is derived from a sulfate or sulfite pulp or primary paper sludge. Chemicals and/or minerals are added prior to drying to give the raw material the appearance and general physical properties of a clay-based filler. The method allows the formation of a cat box filler of high absorbency which controls odor in the cat box and which resembles a clay-based filler. Also, it is virtually dustless and may be incinerated for fast disposal. Furthermore, the method of this invention allows the formation of a filler which resembles a clay-base filler in substantially all respects and allows accurate control of granule size, color, density and other physical properties.

Accordingly, it is an object of this invention to provide for a novel filler material which is for a cat litter box.

Another object of this invention is to provide a cat box filler which is economical to produce, dustless, and easy to dispose of.

Another object of this invention is to provide for a paper-based cat box filler which resembles a clay-based filler.

Another object of this invention is to provide for a cat box filler which has excellent physical properties.

Another object of this invention is to provide for a novel method of producing cat box filler.

Still another object of this invention is to provide for a method of producing cat box filler which allows accurate control of the physical properties of the filler.

Other objects of this invention will become apparent upon a reading of the following description.

DESCRIPTION OF THE PREFERRED EMBODIMENT

The preferred product and method herein described is not intended to be exhaustive or to limit the invention to the precise form or steps described. They are chosen and described to explain the principles of the invention and its application and practical use to enable others skilled in the art to utilize the invention.

An understanding of the filler product of this invention may be obtained by following the procedures below disclosed. The primary material utilized is the waste material from paper manufacture, commonly referred to as paper sludge. Other slurries of plant fibrous materials such as sugar beet, sugar cane, citrus pulp, grain, and potato may be used. There are three basic types of paper sludge, namely, Primary Process, Primary De-Inked and Secondary De-Inked. For cat box filler, the preferred sludge is primary process or primary de-linked sludge, but more specifically is primary process sludge which is the waste material from the manufacture of a sulfate or sulfite based paper having a content of about 75%–99% fiber and 1%–25% filler (kaolin/barytes, titanium dioxide, other plant fibers, etc.) De-inked sludge is the primary waste material from the manufacture of recycled paper such as old newsprint or packaging materials and has a content of 40%–80% fiber and 20%–60% filler. Essentially, the same method is used to treat both types of sludge to form an end product.

In its raw form, paper sludge is approximately 90%–99% water. The raw sludge or slurry is analyzed for composition and bacteria, then dewatered by any accepted method (usually pressing or centrifuging) until it contains approximately 40%–50% solids, with 45% solids being preferred. In this dewatered stage, the paper sludge fiber is broken down or shredded by any conventional method (such as by a delumper, reduction mill or shredder) to a fiber length of 1 mm–10 mm. The preferred equipment is a Fitzpatrick Mill, with the preferred fiber length being 1 mm–4 mm. The sludge or slurry then undergoes a quality adjustment which generally involves the addition of additives, such as dye, titanium dioxide, or barytes to adjust the color, such as a biocide or slimacide to control bacterial and fungal growth, such as kaolin clay or barytes to increase density and such as a fragrance to counteract excrement odors.

The biocide or slimacide is generally formed of one of the following: quaternary ammonium salts, aldehyde derivatives, halogenated styrenes, thiocyanates, carbamates, azo chlorides and modified phenols. Preferred are halogenated styrenes and thiocyanates, specifically a mixture of bromonitrostyrene and methylene bisthiocyanate, such as Slime-Trol ® RX-41 sold by Betz Paperchem, Inc.

After the quality adjustment, the sludge or slurry is agglomerated or granulated by any standard method such as by drum pelletizer, disk pelletizer, pinmill, extruder or granulator, and formed into spherical pellets or, the preferred, granule shape. Should spherical pellets be formed they are flattened by a standard compaction device. The product is then dried until the sludge or slurry contains 1%–10% moisture, by weight. The dying is accomplished in any standard dryer such as a fluid bed dryer, turbo dryer, belt dryer or tray dryer at a temperature range of 200°–750° F. After drying, additional fragrance or color may be added and the product is then packaged and sold as a cat box filler or similar product.

To better understand the process and product, the following examples are submitted:

EXAMPLE I

De-inked sludge from Ft. Howard Paper Company containing 35–40% solids was found to contain 45.3% fiber and 54.7% filler, the fillers being titanium dioxide and kaolin clay. The material was analyzed by Environmental Services Institute for heavy metals and pesticides. The sludge was then dried in an oven at 250° F. until the sludge contained 55% solids and 45% moisture. The sludge was then placed in an Eirich high intensity mixer at 45% water and 55% solids for size reduction or shredding. After shredding, water was added, and the sludge was then placed in a drum pelletizer at 49% moisture to effect granule formation. The granule shaped sludge was then oven dried at 250° F. until the final moisture content was approximately 2.21%. The material was then screened to 6/60 mesh particle size. A biocide was then sprayed on the material at 500 parts per million to control bacteria. An herbal fragrance from Bell-Synfleur was added at the rate of 1.5 lbs. per ton for odor control. A green dye was sprayed on the material for visual effect. The physical properties of the finished material were then tested and found to be as follows:

| US MESH | % RETAINED | |
|---|---|---|
| 6 | 4.25 | |
| 8 | 15.44 | Bulk Density - 44.9 lbs/cft |
| 12 | 26.17 | $H_2O$ Abs - 58% |
| 20 | 48.28 | Oil Abs - 36.6% |
| 30 | 5.01 | Moisture - 2.21% |
| 40 | .83 | |
| 60 | .02 | |
| less than 60 | — | |

EXAMPLE II

A primary process sulfite based sludge from Great Northern Tissue Company was found to contain 27% solids and 73% water. The sludge was found to contain 73.2% fiber and 26.8% kaolin clay filler. The material was sent to Environmental Services Institute for analysis of heavy metals and pesticides. The sludge then underwent a primary size reduction by a Franklin Miller Delumper at 73% moisture level. A secondary size reduction was then carried out in a Fitzpatrick Fitzmill at 68% moisture. The sludge was then formed into granules in a Mars Mineral disk pelletizer with additions of 4% bentonite and/or water and a 50% solution of calcium lignosulfonate for controlling the bulk density and absorbtion. The granules were then dried in a Carrier fluid bed dryer with a three temperature zone (500°-250°-100° F.), to a 5%±2% moisture level. The dryer also acts as an air classifier resulting in a 6/60 mesh size product. The physical properties of the sludge were then tested and found to be as follows:

| US MESH | % RETAINED | |
|---|---|---|
| 6 | 24.37 | |
| 8 | 26.18 | Initial Bulk Density - 14.31 lbs/cft |
| 12 | 22.01 | Final Bulk Density - 28 lbs/cft |
| 20 | 25.34 | Moisture - 5.78% |
| 30 | 1.47 | $H_2O$ Abs - 146% |
| 40 | .33 | Oil Abs - 118.5% |
| 60 | .20 | |
| less than 60 | .10 | |

EXAMPLE III

Primary process sulfate based sludge from Boise Cascade Paper Company was found to contain 49% solids and 51% water. The sludge was found to contain 56.6% fiber and 43.4% titanium dioxide and kaolin clay fillers. The material was sent to Environmental Services Institute for analysis of heavy metals and pesticides. A size reduction was conducted in an Eirich high intensity mixer at 51% moisture. The material was then placed in a drum pelletized with added water for granule formation at 59.8% moisture. A biocide (Slimetrol ® RX41 from Betz Paperchem, Inc.) was added in during pellet formation. The material was then oven dried at 250° F. until the moisture level was approximately 2%. Odor coated agents were then added at the rate of 2 lbs. per ton. The odor agents were a mint fragrance. Physical properties of the material were then examined and found to be as follows:

| US MESH | % RETAINED | |
|---|---|---|
| 6 | 8.15 | |
| 8 | 20.57 | Bulk Density - 27.05 lbs/ft$^3$ |
| 12 | 29.80 | Water Absorbency - 88.0% |
| 20 | 38.41 | Oil Absorbency - 47.03% |
| 30 | 2.70 | Moisture Content - 1.81% |
| 40 | 0.27 | |
| 60 | 0.04 | |
| less than 60 | 0.05 | |

The filler was then packaged and tested in a cat litter box. The filler demonstrated adequate absorbency and controlled odor throughout the 14 day study.

Obviously, other sludge products may require varying the above procedure by changing the concentrations and/or time parameters involved in treating the sludge, depending on the initial physical sludge properties. Biocides may also be applied to the dry finished product to increase bacterial control, depending on the initial sludge analysis. Also, a pesticide such as dichlorvos may be incorporated into the filler to control fleas and other pests.

It is to be understood that the above description does not limit the invention, but may be modified within the scope of the appended claims.

We claim:
1. A method of producing a filler material comprising the steps of:
  (a) providing quantity of a plant fiber slurry;
  (b) adjusting the moisture content of said slurry until the slurry is shredable;
  (c) reducing the fiber size of said slurry;
  (d) adjusting the physical properties of said slurry to predetermined standards;
  (e) agglomerating said slurry by growth agitation procedures into granules which mimic the appearance of naturally occurring clay; and
  (f) drying said granules until they have no more than 10% moisture content.
2. The method of claim 1 and a step of flattening said granules after step (e) and before step (f).
3. The method of claim 1 wherein step (b) includes drying said slurry at 150° F. in a tray dryer.

4. The method of claim 1 wherein step (e) includes agglomerating said slurry in a pinmill.

5. The method of claim 1 wherein step (e) includes agglomerating said slurry in a roller with added water.

6. The method of claim 1 wherein step (d) includes adding a dye to adjust the color of said slurry.

7. The method of claim 6 wherein step (d) includes adding a biocide to said slurry to control bacteria and fungi.

8. The method of claim 7 wherein step (d) includes adding a fragrance to said slurry.

9. The method of claim 1 wherein step (a) includes providing a quantity of primary process paper sludge having 75%-99% fibers by weight.

10. The method of claim 1 and an additional step (g) of packaging said filler material.

11. The method of claim 1 wherein step (a) includes providing a quantity of de-inked paper sludge having 40%-80% fibers by weight.

12. The method of claim 1 wherein step (c) includes shredding said slurry to a fiber size of 1 mm-10 mm.

13. The method of claim 1 wherein step (d) includes adding filler from the group of materials which consists of kaolin clay, titanium dioxide, and barytes to increase the density of said filler material.

14. A filler material comprising paper sludge treated according to the method of claim 1.

15. A filler material for use in a cat litter box, said filler material comprising plant fiber granules, formed by growth agitation procedures, said filler material having an appearance which resembles that of naturally occurring clay, said granules possessing the physical and chemical properties of a naturally occurring clay based substance.

16. The filler material of claim 15 wherein said filler material is formed of one of the group of materials which consists of tree fibers, citrus pulp, sugar cane, sugar beets, grain, potatoes and paper sludge.

17. The filler material of claim 16 and a pesticide incorporated into said filler material.

18. The filler material of claim 16 wherein said granules include added kaolin clay or barytes whereby density of the granules is increased to that of natural clay.

19. The filler material of claim 15 and an incorporated biocide for controlling bacteria and fungi normally found in said filler material.

20. The filler material of claim 15 wherein said filler material includes granules of a size ranging from 6 to 60 mesh size.

21. The filler material of claim 20 wherin the majority of said filler material granules ranges from 8 to 20 mesh size.

* * * * *